US008330466B2

(12) United States Patent  (10) Patent No.: US 8,330,466 B2
Bloemenkamp  (45) Date of Patent: Dec. 11, 2012

(54) METHOD FOR ELECTRICAL INVESTIGATION OF A BOREHOLE

(75) Inventor: Richard Bloemenkamp, Montrouge (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 532 days.

(21) Appl. No.: 12/523,747

(22) PCT Filed: Jan. 18, 2008

(86) PCT No.: PCT/EP2008/000370
§ 371 (c)(1),
(2), (4) Date: Jan. 18, 2010

(87) PCT Pub. No.: WO2008/089919
PCT Pub. Date: Jul. 31, 2008

(65) Prior Publication Data
US 2010/0127709 A1  May 27, 2010

(30) Foreign Application Priority Data

Jan. 22, 2007 (EP) .................................... 07290092

(51) Int. Cl.
*G01V 3/00* (2006.01)
(52) U.S. Cl. .......................... 324/366; 324/354; 324/362
(58) Field of Classification Search ................. 367/1–86; 166/244.1–403; 73/152.01–152.62; 702/1–199; 324/323–375; 343/703, 709, 718–719; 250/253–266; 175/1, 40–50
See application file for complete search history.

(56) References Cited

U.S. PATENT DOCUMENTS

| 4,663,593 A * | 5/1987 | Nekut, Jr. ....................... 324/345 |
| 5,065,100 A * | 11/1991 | Vail, III .......................... 324/339 |
| 7,066,282 B2 * | 6/2006 | Chen et al. ....................... 175/50 |
| 7,309,983 B2 * | 12/2007 | Freedman ....................... 324/303 |
| 7,696,756 B2 * | 4/2010 | Morys et al. ................... 324/366 |
| 2003/0184299 A1 * | 10/2003 | Strack ............................. 324/323 |
| 2004/0245991 A1 | 12/2004 | Hayman et al. |
| 2005/0093548 A1 * | 5/2005 | Ueda et al. ...................... 324/357 |
| 2006/0132128 A1 | 6/2006 | Freedman et al. |
| 2006/0244455 A1 * | 11/2006 | Bittar ............................. 324/337 |

FOREIGN PATENT DOCUMENTS

| EP | 1355171 | 10/2003 |
| GB | 1513595 | 6/1978 |

OTHER PUBLICATIONS

Nikitenko M. et al., New Approximation for a Magnetic Field of a Dipole on a Borehole Axis, Journal of Mining Science, Kluwer Academic Publishers-Consultants Bureau, NE, vol. 42, No. 4, Jul. 1, 2006, pp. 309-314.

* cited by examiner

*Primary Examiner* — Jermele M Hollington
*Assistant Examiner* — Alesa Allgood
(74) *Attorney, Agent, or Firm* — Stephanie Chi; Darla Fonseca; Brigitte Jeffery Echols

(57) ABSTRACT

A method used in electrical investigation of geological formations surrounding a borehole comprising:
  determining S1 a grid of iso-parameter lines GR in a two-dimensional plane, the parameter being an electrical parameter characterizing the geological formation,
  injecting in a localized manner a survey current $I_S$ into a selected zone SZ of the geological formations GF surrounding the borehole BH, and measuring S2 a measured value of a quantity characterizing the electrical parameter of the selected zone based on the survey current, and
  interpolating S3 an interpolated electrical parameter value of the selected zone SZ based on the measured value and the grid of iso-parameter lines GR.

13 Claims, 5 Drawing Sheets

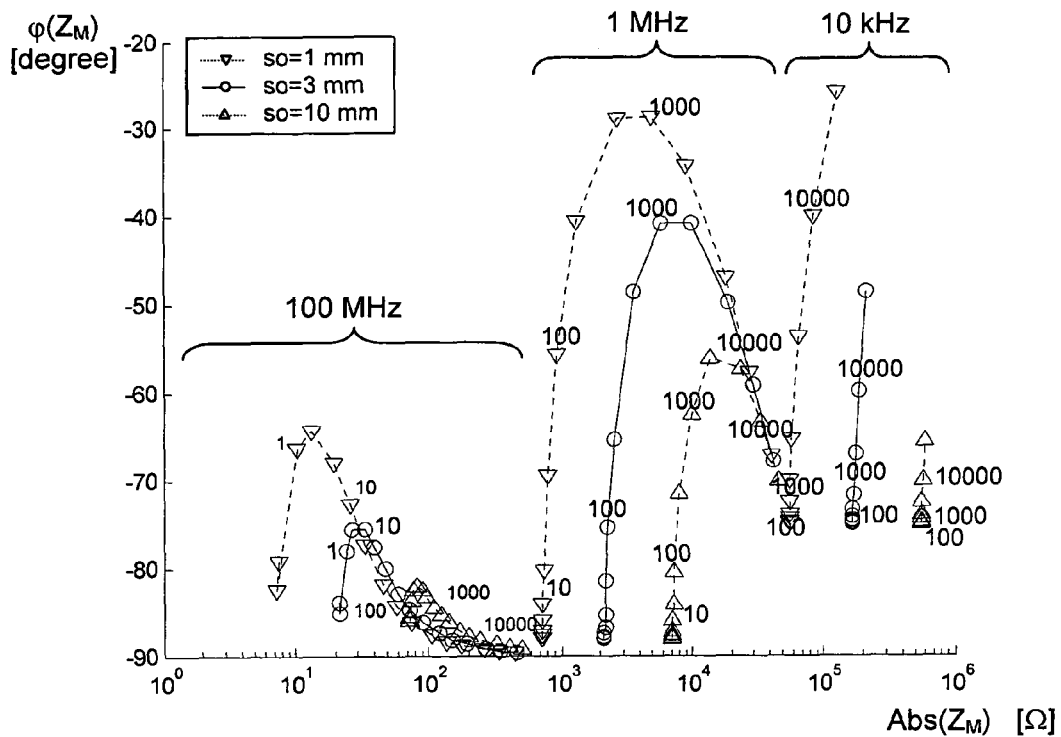
FIG. 1 - PRIOR ART
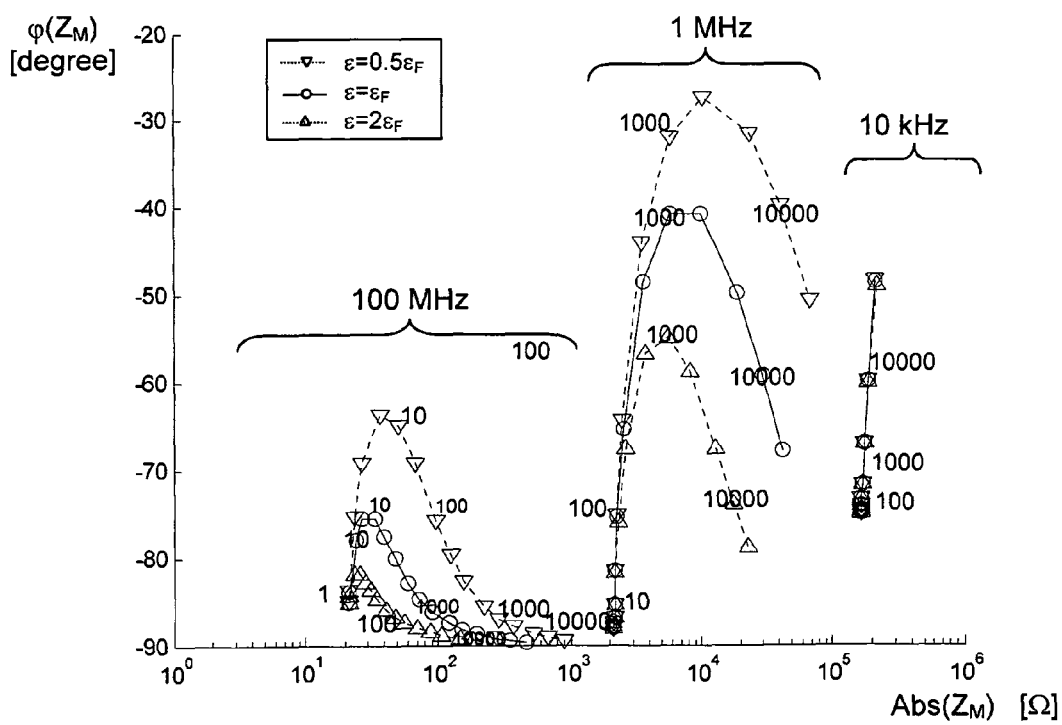
FIG. 2 - PRIOR ART

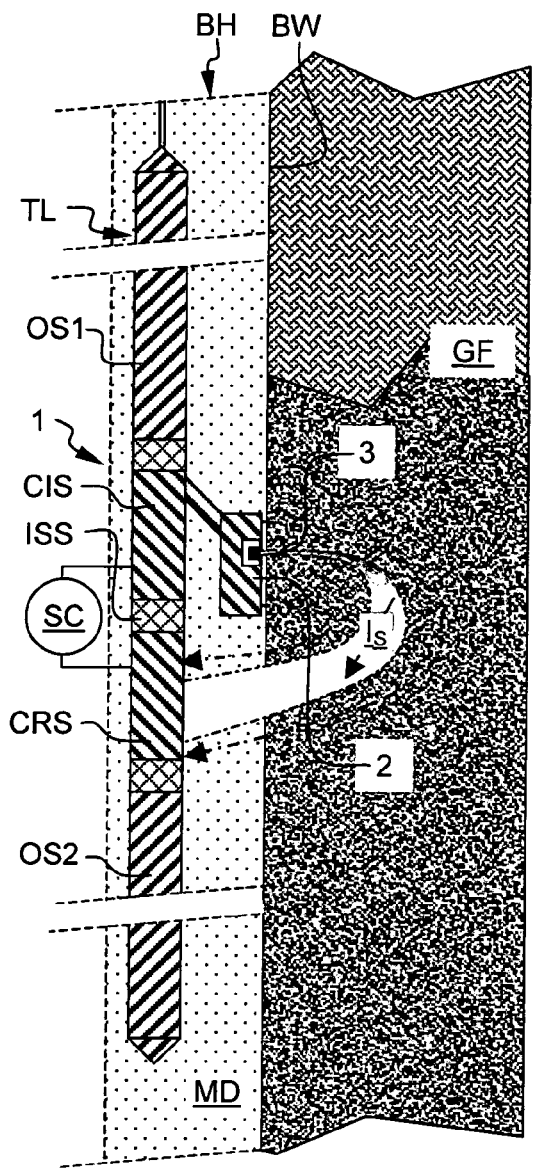
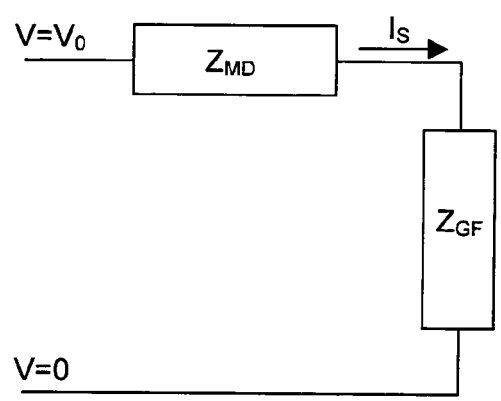
FIG. 4B
FIG. 4A

METHOD FOR ELECTRICAL INVESTIGATION OF A BOREHOLE

FIELD OF THE INVENTION

The invention relates to a method used for the electrical investigation of a borehole penetrating geological formations. The method implemented by a specific tool which is run along the borehole enables micro-electric images of the borehole wall by injecting and measuring survey currents injected into the geological formations. The invention finds a particular application in the oilfield industry.

BACKGROUND OF THE INVENTION

Methods and tools are known, for example from U.S. Pat. No. 4,468,623, U.S. Pat. No. 6,600,321, U.S. Pat. No. 6,714,014 or U.S. Pat. No. 6,809,521 using current injection measurements in order to obtain micro-electric images of a borehole wall, the borehole penetrating geological formations.

When the borehole is filled with a conductive mud, e.g. a water-base mud, such methods and tools normally operate at low frequencies, e.g. below 20 kHz. In conductive mud, the interpretation of the measured current is easily related to the local resistivity of the borehole wall.

When the borehole is filled with a non-conductive or resistive mud, e.g. an oil-base mud, such methods and tools operate at high frequencies, e.g. above around 100 kHz. In a first approximation, in non-conductive or resistive mud the survey current is controlled by the impedance of the mud and the impedance of the formation, combined in series. In this approximation, the impedance between the geological formation and a current return of the tool is neglected. The impedance of the mud is the impedance between a survey current sensor and the geological formation. If the mud impedance is significantly greater than the formation impedance then the measurement is insensitive to the formation impedance. In this case a higher frequency is needed to reduce the mud impedance, by the capacitive effect, so that the formation impedance can be measured.

At high frequencies, in the resistivity range between about 0.1 and 10 Ωm, the phase of the survey current is the most sensitive parameter enabling characterizing the resistivity of the geological formation. At high frequencies, in the resistivity range between about 100 and 1000 Ωm, the magnitude of the survey current is the most sensitive parameter enabling characterizing the resistivity of the geological formation.

FIGS. 1 and 2 show curves representing the magnitude $Abs(Z_M)$ and phase $\phi(Z_M)$ of the impedance measured for various geological formations resistivities at different frequencies. The impedance is measured with a resistive oil base mud. The value of the geological formation resistivity, namely 1 Ωm, 10 Ωm, 100 Ωm, 1000 Ωm, 10000 Ωm is indicated on each curve. The measurements have been made for three frequencies, namely 10 kHz, 1 MHz and 100 MHz. The magnitude $Abs(Z_M)$ axis is based on a logarithmic scale while the phase $\phi(Z_M)$ axis is based on a linear scale.

FIG. 1 shows various curves for various standoffs so. The standoff is the distance between the survey current sensor and the borehole wall. In FIG. 1, curves for three different standoffs so are illustrated, namely 1 mm (dotted line with reversed triangle), 3 mm (plain line with circle) and 10 mm (dotted line with triangle).

FIG. 2 shows various curves for various geological formation permittivity ϵ. In FIG. 2, curves for three different permittivity ϵ are illustrated, namely $0.5\epsilon_f$ (dotted line with reversed triangle), $\epsilon_f$ (plain line with circle) and $2\epsilon_f$ (dotted line with triangle), where $\epsilon_f$ is a typical formation permittivity determined, for example, from laboratory measurements.

FIGS. 1 and 2 illustrate that the measurement behaves differently for low frequencies in the order of 10 kHz, high frequencies in the order of 1 MHz, and very high frequencies in the order of 100 MHz. It is to be noticed that a wrap-around effect for the phase occurs for high and very high frequencies. Thus, it is not possible to use the phase directly as a resistivity measurement at high and very high frequencies. Further, the sensitivity of the measurements is severely decreased for low and very high formation resistivities when using the magnitude as a resistivity measurement. In addition, FIG. 1 illustrates how the standoff influences the phase measurements, in particular below 10000 Ωm, and the magnitude measurements, in particular below 1000 Ωm. Finally, FIG. 2 illustrates how the permittivity influences the phase measurements and the magnitude measurements. Thus, a change of standoff and/or permittivity strongly influences the measurements because both the magnitude and the phase are changed for same value of the geological formations resistivity.

In the prior art, either the magnitude of the survey current or the real part of the inverse of the survey current are used in the determination of the resistivity of the geological formations. Consequently, with a borehole filled with a non-conductive/resistive mud, a change of standoff and/or permittivity significantly influences the determination of the resistivity of the geological formations. Therefore, the methods and tools according to the hereinbefore mentioned prior art may have an insufficient accuracy.

SUMMARY OF THE INVENTION

It is an object of the invention to propose a method for the electrical investigation of geological formations surrounding a borehole that overcomes at least one of the drawbacks of the prior art tool and/or method.

The invention relates to a method used in electrical investigation of geological formations surrounding a borehole comprising:
  determining a grid of iso-parameter lines in a two-dimensional plane, the parameter being an electrical parameter characterizing the geological formation,
  injecting in a localized manner a survey current into a selected zone of the geological formations surrounding the borehole, and measuring a measured value of a quantity characterizing the electrical parameter of the selected zone based on the survey current, and
  interpolating an interpolated electrical parameter value of the selected zone based on the measured value and the grid of iso-parameter lines.

The method further may further comprise the step of repeating the injection step and the interpolation step for other selected zone so as to determine an electrical parameter log of the geological formations surrounding a portion of the borehole.

The measured value may be a measured magnitude and a measured phase of the quantity characterizing the electrical parameter of the selected zone, or a measured in-phase and a measured out-of-phase of the quantity characterizing the electrical parameter of the selected zone.

The electrical parameter characterizing the geological formation may be a resistivity of the geological formation, or a conductivity of the geological formation, or a function of the resistivity of the geological formation.

The two-dimensional plane may be defined by a first axis representing a magnitude of a quantity characterizing the resistivity of the geological formation and a second axis representing a phase of the quantity characterizing the resistivity of the geological formation, the first and second axes being orthogonal. Alternatively, the two-dimensional plane may be defined by a first axis representing a first function of a magnitude and a phase of a quantity characterizing the resistivity of the geological formation and a second axis representing a second function of a magnitude and a phase of the quantity characterizing the resistivity of the geological formation.

The grid of iso-parameter lines may be a grid of p-compensated iso-resistivity lines, where p is the ratio between mud permittivity and standoff, or a grid of geological formations permittivity compensated iso-resistivity lines, or a combination of the grid of p-compensated iso-resistivity lines and the geological formations permittivity compensated iso-resistivity lines.

The value of the ratio p may be estimated by interpolation based on the measured value and iso-p curves, the iso-p curves being lines that intersect the iso-resistivity-lines in a low resistivity region, the low resistivity region being the region where measurements are more affected by the ratio p than by the geological formations permittivity.

The value of the formation permittivity may be estimated by interpolation based on the measured value and iso-formation permittivity curves, the iso-formation permittivity curves being lines that intersect the iso-resistivity-lines in a high resistivity region, the high resistivity region being the region where measurements are more affected by the geological formations permittivity than by the ratio p.

The quantity characterizing the resistivity of the geological formations may be a measured survey current, or a measured survey voltage, or a quantity derived from the measured survey current and the measured survey voltage, or a quantity derived from the measured survey current or the measured survey voltage.

The quantity derived from the measured survey current and the measured survey voltage may be a measured impedance.

The grid of iso-parameter lines may be determined by performing a simulation based on modeling, or performing laboratory experiments, or performing an in-situ calibration.

Optionally, the method may further comprise the step of attributing a warning-flag to an interpolated electrical parameter value corresponding to an ambiguous electrical parameter value.

The method may further comprise the step of performing another measurement physically different from the electrical parameter measurement in order to resolve the ambiguous electrical parameter value. The physically different measurement may be an acoustic standoff measurement. Alternatively, the method may further comprise the step of performing a likelihood estimation based on an earlier electrical parameter measurement and/or a later electrical parameter measurement in order to resolve the ambiguous electrical parameter value.

The invention also relates to a tool used in electrical investigation of geological formations surrounding a borehole, the tool being adapted to be deployed in the borehole by a surface equipment, the tool comprising a high frequency injection tool, the high frequency injection tool comprising a current injection section, a current return section and a current or voltage source, the current injection section being electrically decoupled from the current return section, the current or voltage source being connected between the current injection and the current return section, the high frequency injection tool comprising at least one pad for contacting a wall of the borehole, the pad carrying at least one electrode for injecting in a localized manner a survey current into a selected zone of the geological formations surrounding the borehole, wherein the tool is adapted to measure a measured value of a quantity characterizing an electrical parameter of the selected zone based on the survey current, and to interpolate an interpolated electrical parameter value of the selected zone based on the measured value and the grid of iso-parameter lines.

The invention enables determining the formation resistivity with a better accuracy than prior art method and device.

The invention proposes an effective interpretation method enabling obtaining the formation resistivity using both the phase and magnitude of the measured current.

With the invention, it is possible to compensate for standoff effects in the low resistivity range and for formation permittivity effects in the high resistivity range. It is also possible to determine an estimate of the formation permittivity in the high resistivity range.

These and other aspects of the invention will be apparent from and elucidated with reference to the embodiments described hereinafter.

BRIEF DESCRIPTION OF THE DRAWINGS

The present invention is illustrated by way of example and not limited to the accompanying figures, in which like references indicate similar elements:

FIG. 1 is a graphic representing the magnitude and phase of the impedance measured for various geological formations resistivities at different frequencies and for various standoffs with the method and tool according to the prior art;

FIG. 2 is a graphic representing the magnitude and phase of the impedance measured for various geological formations resistivities at different frequencies and for various geological formation permittivities with the method and tool according to the prior art;

FIG. 4A is a partial cross-section view in a borehole showing a part of a typical high-frequency current injection tool implementing the method of the invention;

FIG. 4B schematically show an approximate equivalent circuit model corresponding to FIG. 4A;

DETAILED DESCRIPTION OF THE INVENTION

Figure 3:
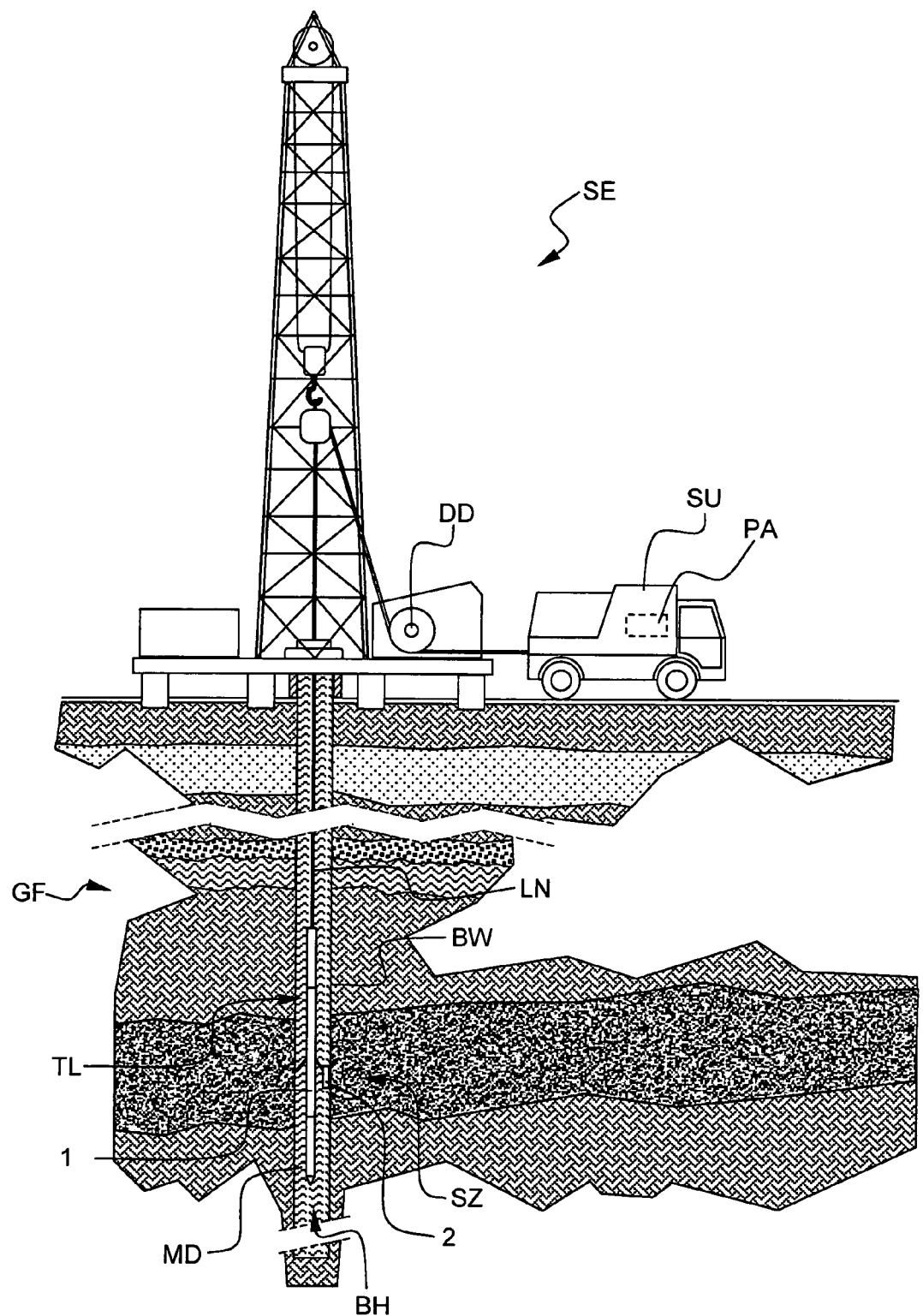
FIG. 3 schematically illustrates a typical onshore hydrocarbon well location.

FIG. 3 schematically shows a typical onshore hydrocarbon well location and surface equipments SE above hydrocarbon geological formations GF after drilling operations have been carried out. At this stage, i.e. before a casing string is run and before cementing operations are carried out, the wellbore is a borehole BH filled with a fluid mixture MD. The fluid mixture MD is typically a drilling fluid. In this example, the surface equipments SE comprise an oil rig and a surface unit SU for deploying a logging tool TL in the well-bore. The surface unit may be a vehicle coupled to the logging tool by a line LN. Further, the surface unit comprises an appropriate device DD for determining the depth position of the logging tool relatively to the surface level. The logging tool TL comprises various sensors and provides various measurement data related to the hydrocarbon geological formation GF and/or the fluid mixture DM. These measurement data are collected by the logging tool TL and transmitted to the surface unit SU. The surface unit SU comprises appropriate electronic and software arrangements PA for processing, analyzing and storing the measurement data provided by the logging tool TL.

The logging tool TL comprises a high-frequency current injection tool 1 provided with at least one pad 2 for investigating the electric properties of a subsurface geological formation GF according to the invention. Once the logging tool is positioned at a desired depth, the pad 2 can be deployed from the tool 1 against the borehole wall BW by any appropriate deploying arrangement that is well known in the art so that it will not be further described. The resistivity of a selected zone SZ can be measured. Such a measurement can be repeated for other azimuth and other depth so as to obtain micro-electric images of the borehole wall and a resistivity log of the geological formations.

FIG. 4A is a partial cross-section view in a borehole showing a typical high-frequency current injection tool implementing the method of the invention.

The tool TL comprises a high-frequency current injection tool 1, a first section OS1 and a second section OS2. The high-frequency current injection tool 1 comprises a current injection section CIS and a current return section CRS. In this particular example, the high-frequency current injection tool 1 is positioned between the first OS1 and second OS2 sections. It will be apparent for those versed in the art that this example is not limitative and that many other configurations are also possible, e.g. with high-frequency current injection tool 1 at the bottom or at the top of the tool TL, etc. . . . . The current return section CRS is positioned adjacent to, more precisely below the current injection section CIS. The current injection section CIS is electrically decoupled from the current return section CRS by means of an isolation section ISS. The current return section CRS and the current injection section may be electrically decoupled from the first section OS1 and the second section OS2. A current or voltage source SC is connected between the current injection section CIS and the current return section CRS. The current or voltage source SC applies a voltage drop between these sections. The tool further comprises a pad 2 that is deployed by means of arm such that the pad 2 contacts the wall BW of the borehole BH. The pad 2 carries at least one electrode 3 for injecting a survey current $I_S$ into the geological formations GF. The survey current $I_S$ is injected at a frequency between around 1 and 50 MHz. Those skilled in the art understand that a particular example of a high frequency injection tool has been described above and that the invention can also be implemented in other type of high frequency injection tool, for example in a high frequency injection tool that does not comprise a specifically isolated return section.

FIG. 4B schematically show an approximate equivalent circuit model corresponding to FIG. 4A. In non-conductive/resistive mud the survey current $I_S$ is controlled by the impedance of the mud $Z_{MD}$ and the impedance of the formation $Z_{GF}$, combined in series. The impedance of the mud $Z_{MD}$ is the impedance of the mud the bore wall facing side of the current injection section CIS, namely the bore wall facing side of the pad 2, and the bore wall BH of the geological formation GF. A voltage drop (from $V=V_0$ to $V=0$) is applied between the current injection section and the current return section. In the following, the impedance between the current return section and the formation which is also in series with the mud impedance $Z_{MD}$ and the formation impedance $Z_{GF}$ has been left out for simplification reasons.

In the first order, the survey current $I_S$ may be modeled with the formula:

$$I_S = \frac{V}{Z_{MD} + Z_{GF}} = \frac{V}{Z_{MS}}$$

where V is the potential difference, which injects current into the formation.

The measurement aims at obtaining the formation resistivity $\rho_{GF}$ which is proportional to the real part of the impedance $Z_{GF}$, from the determination of the measured impedance $Z_{MS}$ based on the measurement of the survey current $I_S$ and the knowledge of the potential difference V applied.

As two parameters, i.e. a magnitude $\text{Abs}(Z_{MS})$ and a phase $\phi(Z_{MS})$ are associated with each measurement, while only one of these parameters is necessary to determine the formation resistivity, there is one degree of freedom left. This degree of freedom may be used to perform a compensation for different effects. This compensation proceeding will be described in relation with FIGS. 5 to 8.

Figure 5:
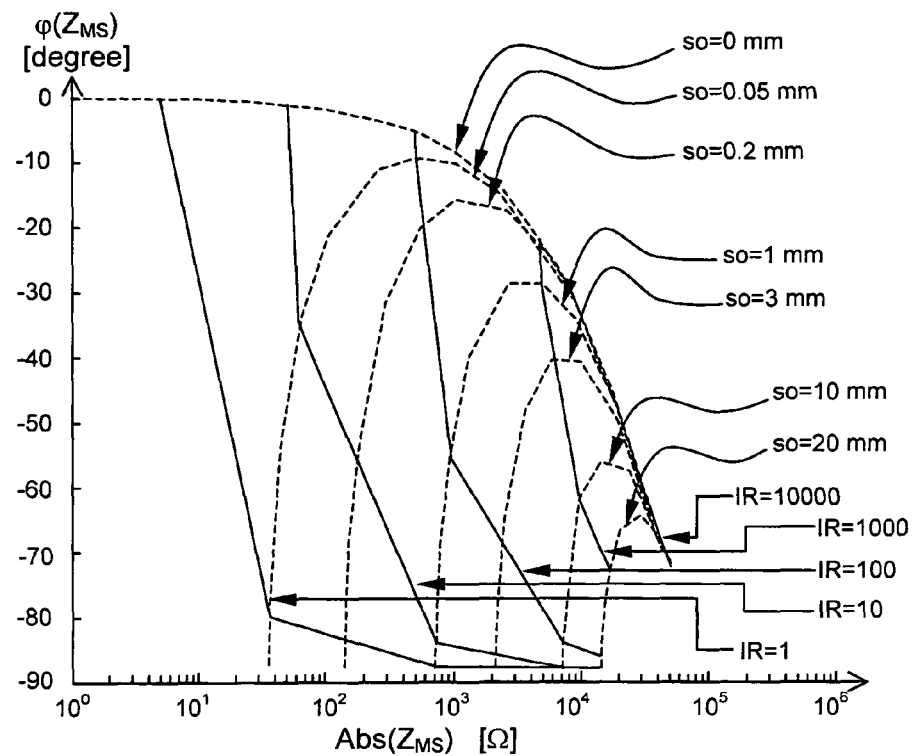
FIG. 5 is a graphic representing the magnitude and phase of the impedance measured at 1 MHz showing iso-resistivity lines compensating for standoff and mud permittivity.
Figure 6:
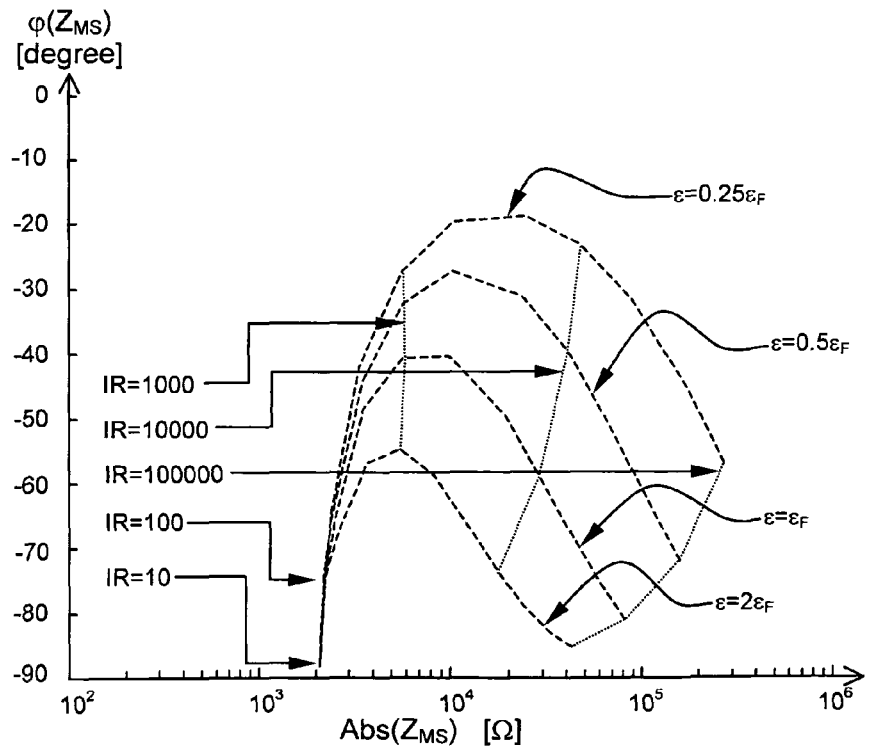
FIG. 6 is a graphic representing the magnitude and phase of the impedance measured at 1 MHz showing iso-resistivity lines compensating for formation permittivity.
Figure 7:
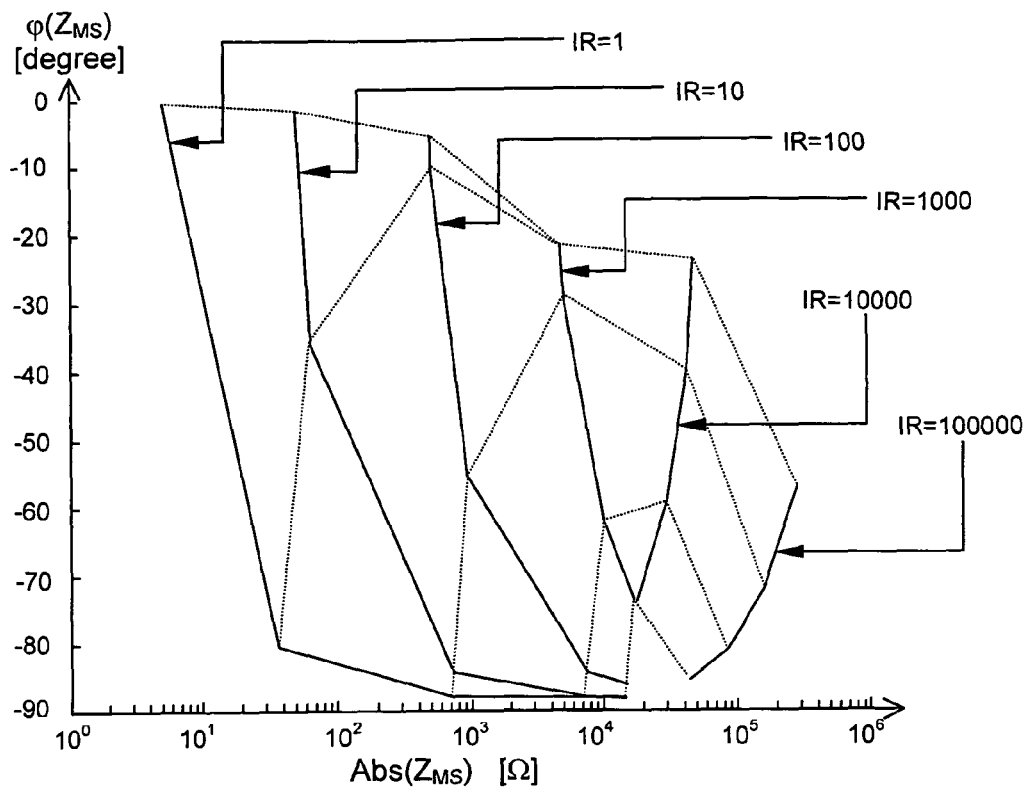
FIG. 7 is a graphic representing the magnitude and phase of the impedance measured at 1 MHz showing a grid of iso-resistivity lines compensating for standoff, mud permittivity and formation permittivity.

FIGS. 5, 6 and 7 are graphs representing the magnitude $\text{Abs}(Z_{MS})$ and phase $\phi(Z_{MS})$ of the impedance $Z_{MS}$ measured at 1 MHz. The magnitude $\text{Abs}(Z_{MS})$ axis is based on a logarithmic scale while the phase $\phi(Z_{MS})$ axis is based on a linear scale. Those versed in the art would recognize that plotting the measured impedance $Z_{MS}$ (as shown) or plotting the measured survey current $I_S$ (not shown) normalized by the voltage V ($I_S/V$) result in equivalent graphs where only the phase is sign changed, and the magnitude of the current in log scale is sign changed.

According to the invention, it is proposed to define iso-resistivity lines in a two dimensional plane. The two-dimensional plane is defined by a first axis representing magnitude $\text{Abs}(Z_{MS})$ of the measured impedance $Z_{MS}$ and a second axis representing the phase $\phi(Z_{MS})$ of the measured impedance $Z_{MS}$. The first and second axes are orthogonal. As indicated above, it is also possible to define the two-dimensional plane by the magnitude and the phase of the measured survey current.

More precisely, FIG. 5 shows impedance curves for the standoff around 0 mm, 0.05 mm, 0.2 mm, 1 mm, 3 mm, 10 mm and 20 mm and with constant mud permittivity $\epsilon_{MD}$. For geological formations of low resistivity and provided that the mud resistivity is high enough, the injection tool is mostly affected by the standoff and the mud permittivity.

To a first approximation the mud impedance is capacitive and is given by $Z_{MD} \approx A \cdot \epsilon_{MD}/SO$ Where A is the survey electrode area. Thus the standoff and the mud permittivity affect the measured impedance $Z_{MS}$ in the inverse way, and it is possible to compensate for both of them at the same time by connecting points with the same formation resistivity but different standoff and/or mud permittivity, i.e. different values of a quantity p corresponding to the ratio between the mud permittivity and the standoff. These results are the p-compensated iso-resistivity lines IR shown in FIG. 5 for resistivity values IR around 1 Ωm, 10 Ωm, 100 Ωm, 1000 Ωm and 10000 Ωm.

Further, FIG. 6 shows impedance curves for the permittivity of the geological formations $\epsilon$ around $0.25\epsilon_f$, $0.5\epsilon_f$, $\epsilon_f$ and $2\epsilon_f$. For geological formations of high resistivity the injection tool is mostly affected by the formations permittivity. It is possible to compensate for the formations permittivity by connecting points with the same formation resistivity but different formations permittivity. This results in the geological formations permittivity compensated iso-resistivity lines IR shown in FIG. 6 for resistivity value IR around 10 Ωm, 100 Ωm, 1000 Ωm, 10000 Ωm and 100000 Ωm. These iso-resistivity lines compensate for the geological formations permittivity.

Finally, FIG. 7 shows a grid of iso-resistivity lines compensating for the standoff, the mud permittivity and the geological formations permittivity. The grid of iso-resistivity lines is obtained by combining the iso-resistivity lines compensating for variation in quantity p of FIG. 5 and the iso-resistivity lines compensating for the geological formations permittivity of FIG. 6.

Figure 8:
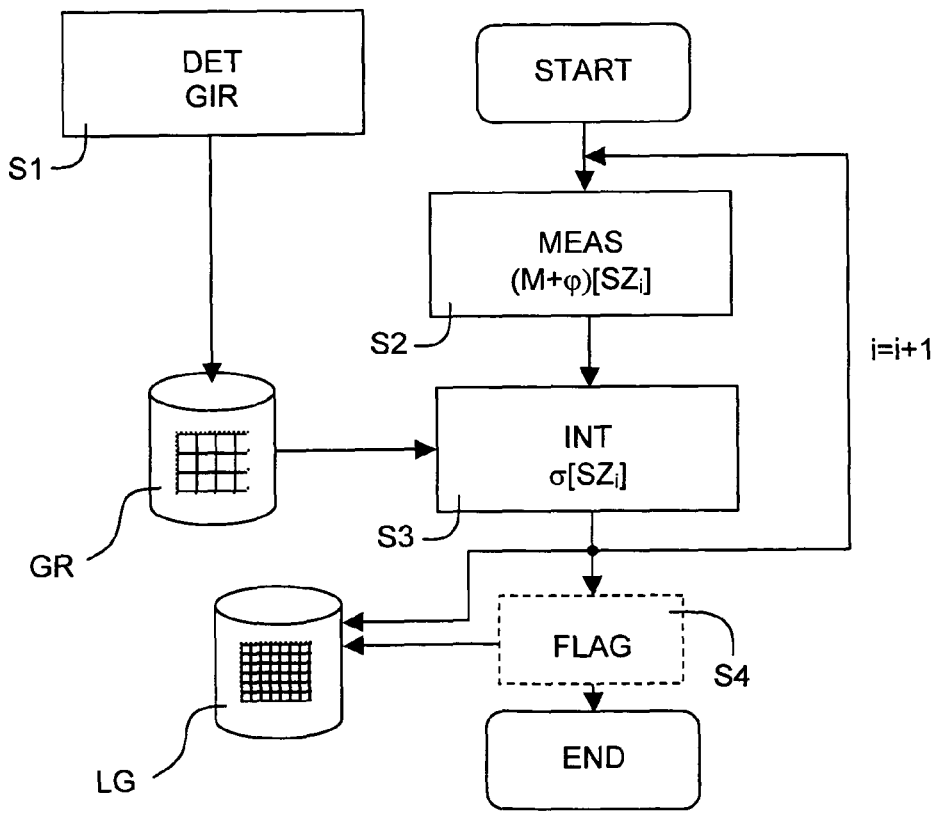
FIG. 8 schematically illustrates the method according to the invention.

FIG. 8 schematically illustrates the method used in electrical investigation of geological formations surrounding a borehole according to the invention. In a first step S1, a grid of iso-resistivity lines GR in a two-dimensional plane is determined. The grid of iso-resistivity lines may be either the p-compensated iso-resistivity lines of FIG. 5, or the geological formations permittivity compensated iso-resistivity lines of FIG. 6 or the combination of FIG. 7. The grid of iso-resistivity lines may be determined by either performing a simulation based on modeling, or performing laboratory experiments, or performing an in-situ calibration.

In a second step S2, at least one measurement is performed by injecting in a localized manner a survey current into a first selected zone $SZ_i$ of the geological formations surrounding the borehole. The measurement comprises measuring the survey current and determining a measured magnitude and a measured phase of the parameter characterizing the resistivity of the selected zone based on the survey current.

In a third step S3, a resistivity value of the selected zone is interpolated based on the measured magnitude, the measured phase and the grid of iso-resistivity lines GR. Many interpolation algorithms known by those versed in the art can be used to interpolate the resistivity at all points on the phase-magnitude plane, and thus will not be further described.

The second injection and measuring step S2 and the third interpolation step S3 may be repeated for other selected zone $SZ_{i+1}$ so as to determine a resistivity log LG of the geological formations surrounding a portion of the borehole.

Optionally, a fourth step S4 may be implemented when a resistivity value cannot be correctly determined. For example, such a situation may occur when the surfaces of resistivity as a function of phase and magnitude are not well behaved and can become multi-valued. The fourth step S4 comprises putting a warning-flag that an ambiguous resistivity value has been measured. This warning-flag may also be stored in the resistivity log LG.

As another option, in the case where a non-unique measurement occurs, the correct resistivity value can be determined based on additional information or based on likelihood estimation. Additional information may be obtained by means of an additional measurement either for the same selected zone at another frequency, or for a different selected zone at the same frequency (e.g. the pad is positioned differently). Further, a physically different measurement may be performed, for example an acoustic standoff measurement, in order to resolve the ambiguity. Otherwise, a likelihood estimation can be performed which avoids obtaining a second measurement. The likelihood estimation may be based on earlier and/or later, preferably, unambiguous measurements. As an example, if an earlier measurement and/or a later measurement indicate(s) a resistivity of 5 Ωm, then it is more likely that a correct current resistivity value is 10 Ωm rather than 1000 Ωm. Therefore, a probable current resistivity value can be chosen between ambiguous measurements based on this likelihood estimation.

It is to be noted that except for the measurement step S2, the other steps can be performed downhole by means of the tool electronics and processing circuit (not shown) or by appropriate electronic and software arrangements in the surface unit.

Further, the electrical investigation method of the invention can also be used to determine a value or at least an indication of the standoff and the mud permittivity in the low-resistivity region, and the formation permittivity in the high-resistivity region. Such a determination is possible based on two measurements providing two distinct points in the magnitude-phase plane and provided that they both lie on the same iso-resistivity line. In such a case, the difference between these two measurements is most-likely resulting from a difference in standoff or a difference in mud-permittivity. Thus, it can be assumed that different points on the same iso-resistivity line enable determining a value or at least an indication of the standoff and/or mud-permittivity.

Furthermore, based on the iso-resistivity lines in the amplitude-phase plane, it is also possible to define lines that intersect these iso-resistivity-lines. In the low resistivity region, these curves are iso-p-lines. The low resistivity region is the region where measurements are more affected by the ratio p than by the geological formations permittivity. In a way analogous to the interpolation between iso-resistivity lines for obtaining a resistivity value, it is possible to interpolate the quantity p based on the iso-p-lines. Based on a known mud permittivity, the standoff can be deduced and vice-versa. In the high-resistivity region these curves are iso-formation-permittivity curves. The high resistivity region is the region where measurements are more affected by the geological formations permittivity than by the ratio p. In a way analogous to the interpolation between iso-resistivity lines for obtaining a resistivity value, it is possible to interpolate the formation permittivity from the iso-formation permittivity lines.

In the example of FIG. 7, the low-resistivity region where iso-p lines are plotted (from FIG. 5) is up to 1000 Ωm while the high-resistivity region where iso-formation permittivity curves are plotted (from FIG. 6) is above 10000 Ωm. The boundary between "low" and "high" resistivity depends on the measurement frequency and also on the geometry of the electrode(s). The low/high boundary scales roughly in inverse proportion to the measurement frequency. For example, at a measurement frequency of 10 MHz, the low/high boundary is roughly a factor of 10 lower than at a measurement frequency of 1 MHz.

The invention has been hereinbefore described according to an example in which an iso-resistivity grid is used. Nevertheless, those versed in the art will recognize that the invention will lead to analogous results with other type of grid. For example, the invention can be generalized to an iso-conductivity grid, the conductivity being the inverse of the resistivity. Indeed, the invention can be generalized to an iso-parameter grid where the parameter is a function of the resistivity. In this example, after the interpolation step, the resistivity can be calculated as the inverse function of the parameter. Advantageously, the function is a function for which an inverse value exists locally, e.g. an elementary function or a composition of elementary functions. Further, the invention has been hereinbefore described according to an example in which the interpolation step is based on the measured magnitude and the measured phase. Nevertheless, those versed in the art will recognize that the invention will lead to analogous results with an interpolation step based on an in-phase measurement and an out-of-phase measurement. For example, the measured magnitude and phase can be converted in a measured in-phase and out-of-phase before the interpolation step. Indeed, the invention can be generalized so that, before the interpolation step, the measured magnitude and the measured phase are converted into a first function and a second function of the measured magnitude and the measured phase.

Furthermore, the invention has been hereinbefore described according to an example in which the magnitude and the phase are measured. Nevertheless, those versed in the art will recognize that the invention will lead to analogous results when measuring the in-phase and the out-of-phase directly.

Finally, the invention as hereinbefore described is not limited to the determination of a resistivity log. Indeed, the resistivity can be converted into conductivity and a conductivity log can be determined.

FINAL REMARKS

A particular application of the invention relating to a wireline tool has been described. However, it is apparent for a person skilled in the art that the invention is also applicable to a logging-while-drilling tool. A typical logging-while-drilling tool is incorporated into a bottom-hole assembly attached to the end of a drill string with a drill bit attached at the extreme end thereof. Measurements can be made either when the drill string is stationary or rotating. In the latter case an additional measurement is made to allow the measurements to be related to the rotational position of the drill string in the borehole. This is preferably done by making simultaneous measurements of the direction of the earth's magnetic field with a compass, which can be related to a reference measurement made when the drill string is stationary. It will also be apparent for a person skilled in the art that the invention is applicable to onshore and offshore hydrocarbon well location.

It is apparent that the term "pad" used hereinbefore generically indicates a contacting element with the surface of the borehole wall. The particular contacting element shown in the Figures for maintaining the electrode in engagement with the borehole wall is illustrative and it will be apparent for a person skilled in the art that other suitable contacting element may be implemented, for example a sonde with a backup arm, a centralizer, etc. . . . .

Finally, it is also apparent for a person skilled in the art that application of the invention to the oilfield industry is not limited as the invention can also be used in others types of geological surveys.

The drawings and their description hereinbefore illustrate rather than limit the invention.

Any reference sign in a claim should not be construed as limiting the claim. The word "comprising" does not exclude the presence of other elements than those listed in a claim. The word "a" or "an" preceding an element does not exclude the presence of a plurality of such elements.

The invention claimed is:

1. A method used in electrical investigation of geological formations surrounding a borehole comprising:
   determining (S1) a grid of iso-parameter lines (GR) in a two-dimensional plane, the parameter being an electrical parameter characterizing the geological formation,
   injecting in a localized manner a survey current ($I_S$) into a selected zone (SZ) of the geological formations (GF) surrounding the borehole (BH), and measuring (S2) a measured value of a quantity characterizing the electrical parameter of the selected zone based on the survey current, and
   interpolating (S3) an interpolated electrical parameter value of the selected zone (SZ) based on the measured value and the grid of iso-parameter lines (GR)
   estimating a formation permittivity value by interpolation based on the measured value and iso-formation permittivity curves, the iso-formation permittivity curves being lines that intersect the iso-resistivity-lines in a high resistivity region, the high resistivity region being the region where measurements are more affected by the geological formations permittivity than by a ratio p, wherein p is a ratio between a mud permittivity and a standoff.

2. The method according to claim 1, wherein the step of determining (S1) the grid of iso-parameter lines comprises performing a simulation based on modeling.

3. The method according to claim 1, wherein the step of determining (S1) the grid of iso-parameter lines comprises performing laboratory experiments.

4. The method according to claim 1, wherein the step of determining (S1) the grid of iso-parameter lines comprises performing an in-situ calibration.

5. The method according to claim 1, wherein the method further comprises the step of attributing a warning-flag (S4) to an interpolated electrical parameter value corresponding to an ambiguous electrical parameter value.

6. The method according to claim 1, wherein the method further comprises the step of performing a likelihood estimation based on an earlier electrical parameter measurement and/or a later electrical parameter measurement in order to resolve the ambiguous electrical parameter value.

7. The method according to claim 1, wherein the survey current is injected at a frequency between around 1 and 50 MHz.

8. The method according to claim 1, wherein measuring the measured value of the quantity characterizing the electrical parameter comprises measuring a survey current ($I_S$), or a measured survey voltage, or a quantity derived from the measured survey current ($I_S$) and the measured survey voltage, or a quantity derived from the measured survey current ($I_S$) or the measured survey voltage.

9. The method according to claim 8, wherein the quantity derived from the measured survey current ($I_S$) and the measured survey voltage is a measured impedance ($Z_{MS}$).

10. The method according to claim 1, wherein the method further comprises the step of performing another measurement physically different from the electrical parameter measurement in order to resolve the ambiguous electrical parameter value.

11. The method according to claim 10, wherein the physically different measurement is an acoustic standoff measurement.

12. A wireline tool for performing an electrical measurement of a formation surrounding a borehole, the tool comprising:
   an injection electrode for injecting a current into the formation;
   a return electrode, being electrically decoupled from the injection electrode, for receiving the current from the formation;
   a power source connected being connected between the injection electrode and return electrode for causing the current to be of high frequency;

a pad for carrying the injection electrode and contacting the wall of the borehole for causing the current to be injected in a localized manner; and wherein the tool is capable of measuring a value of a quantity characterizing an electrical parameter based on the current, and interpolating an electrical parameter value based on the measured value and a grid of iso-parameter lines in a two-dimensional plane, the parameter being an electrical parameter characterizing the formation.

13. A logging while drilling tool for performing an electrical measurement of a formation surrounding a borehole, the tool comprising:

an injection electrode for injecting a current into the formation;

a return electrode, being electrically decoupled from the injection electrode, for receiving the current from the formation;

a power source connected being connected between the injection electrode and return electrode for causing the current to be of high frequency;

a pad for carrying the injection electrode and positioning the electrode substantially adjacent the wall of the borehole for causing the current to be injected in a localized manner; and wherein the tool is capable of measuring a value of a quantity characterizing an electrical parameter based on the current, and interpolating an electrical parameter value based on the measured value and a grid of iso-parameter lines in a two-dimensional plane, the parameter being an electrical parameter characterizing the formation.

* * * * *